(12) United States Patent
Okada

(10) Patent No.: US 11,735,335 B2
(45) Date of Patent: Aug. 22, 2023

(54) WATER-STOP STRUCTURE AND WATER-STOP PARTS FOR SHIELDED CABLE

(71) Applicant: Yazaki Corporation, Tokyo (JP)

(72) Inventor: Yuji Okada, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/858,249

(22) Filed: Jul. 6, 2022

(65) Prior Publication Data
US 2023/0022337 A1 Jan. 26, 2023

(30) Foreign Application Priority Data

Jul. 14, 2021 (JP) ................. 2021-116574

(51) Int. Cl.
*H01B 7/282* (2006.01)
*H01B 7/02* (2006.01)
*H01B 7/40* (2006.01)

(52) U.S. Cl.
CPC ........... *H01B 7/282* (2013.01); *H01B 7/0266* (2013.01); *H01B 7/40* (2013.01)

(58) Field of Classification Search
CPC ............ H01R 13/5205; H01R 13/5219; H01R 13/5221; H01R 13/6592; H01R 13/6591; H01R 9/0518; H01B 7/282; H01B 7/0266; H01B 7/40; H02G 3/22; H02G 15/013; Y02A 30/14; H05K 5/0247; B60R 16/0222
See application file for complete search history.

(56) References Cited

U.S. PATENT DOCUMENTS

| 6,793,532 B2 * | 9/2004 | Saito | H01R 9/0518 |
| | | | 439/607.41 |
| 7,641,271 B1 * | 1/2010 | Haydin | B60R 16/0222 |
| | | | 296/1.07 |
| 9,793,692 B1 * | 10/2017 | Pogash | H02G 3/083 |
| 10,490,931 B2 * | 11/2019 | Furuya | H01R 13/5208 |
| 10,734,754 B2 * | 8/2020 | Hayashi | B60R 16/0215 |
| 2002/0048994 A1 * | 4/2002 | Oota | H01R 9/24 |
| | | | 439/98 |
| 2002/0173181 A1 * | 11/2002 | Matsumoto | H01R 13/6593 |
| | | | 439/98 |
| 2012/0217041 A1 * | 8/2012 | Agusa | H02G 3/22 |
| | | | 174/153 G |
| 2014/0151087 A1 | 6/2014 | Adachi et al. | |
| 2015/0318679 A1 * | 11/2015 | Nakai | H01R 13/5219 |
| | | | 16/2.2 |

(Continued)

FOREIGN PATENT DOCUMENTS

JP 2013-38919 A 2/2013

*Primary Examiner* — Hoa C Nguyen
*Assistant Examiner* — Amol H Patel
(74) *Attorney, Agent, or Firm* — Sughrue Mion, PLLC

(57) ABSTRACT

A water stop structure for a shield cable includes a lead-in port formed in a sheet metal of a housing, a grommet to be liquid-tightly fitted into the lead-in port, a shield shell disposed outside the housing so as to surround the grommet and with an end portion of a braid of the shield cable being crimped, and a spacer configured to adjust an attachment height of the shield shell with respect to the sheet metal so as to fasten the shield shell to the sheet metal in a state where conduction is ensured.

5 Claims, 6 Drawing Sheets

(56) References Cited

U.S. PATENT DOCUMENTS

| | | | | |
|---|---|---|---|---|
| 2015/0325947 A1* | 11/2015 | Wang | ................. | H01R 13/5202 |
| | | | | 277/616 |
| 2015/0364856 A1* | 12/2015 | Nakai | .................. | H01B 17/583 |
| | | | | 174/152 G |
| 2023/0175611 A1* | 6/2023 | Kobayashi | ........... | H01B 17/583 |
| | | | | 174/668 |

* cited by examiner

WATER-STOP STRUCTURE AND WATER-STOP PARTS FOR SHIELDED CABLE

CROSS-REFERENCE TO RELATED APPLICATIONS

This application is based on and claims priority under 35 USC 119 from Japanese Patent Application No. 2021-116574 filed on Jul. 14, 2021, the contents of which are incorporated herein by reference.

TECHNICAL FIELD

The present invention relates to a water stop structure and a water stop component for a lead-in portion where a shield cable having a braid is led into a housing.

BACKGROUND ART

Patent Literature 1 discloses a water stop structure for a lead-in portion where a shield cable is led into a housing. In an example of the water stop structure shown in FIG. 5 of Patent Literature 1, a high-voltage electric wire 100Wa in a shield cable 100W is inserted from the outside to the inside through a through hole 102a of a sheet metal 102 of a vehicle body 101. A grommet 120 made of rubber or resin is liquid-tightly fitted into the through hole 102a, and the high-voltage electric wire 100 Wa is passed through each electric wire insertion tube portion 122 of the grommet 120, so that a through portion of the high-voltage electric wire 100Wa with respect to the sheet metal 102 is water-stopped.

Further, a metal shield shell 110 is directly fixed to an outer surface of the sheet metal 102, and an end portion of a braid 100Wc of the shield cable 100W is crimped and fixed to an outer periphery of an opening tubular portion 112 of the shield shell 110 by a crimping ring 113. Therefore, the lead-in portion where the shield cable 100W is led into the housing (vehicle body 101) is electromagnetically shielded.

CITATION LIST

Patent Literature

Patent Literature 1: JP-A-2013-38919

SUMMARY OF INVENTION

In the example of the water stop structure having a shield function as described above, it is general to use a specific dedicated combination product as the grommet 120 and the shield shell 110 according to a size of the through hole 102a of the sheet metal 102 and the like. Therefore, there is a problem in that the cost is increased because a limited dedicated product is required to be used.

The present invention has been made in view of the above circumstances, and an object thereof is to provide a water stop structure and a water stop component for a shield cable with which cost can be reduced.

In order to achieve the above object, a water stop structure and a water stop component for a shield cable according to the present invention are characterized as follows.

The water stop structure for a shield cable is a water stop structure to be applied to a lead-in portion where the shield cable is led into a housing, the shield cable having a braid and a coated electric wire inside the braid, the water stop structure for a shield cable including:

a lead-in port formed in a sheet metal constituting a part of the housing and through which the exposed coated electric wire is inserted from outside to inside of the housing;

a grommet to be fitted into the lead-in port and configured to cover an outer periphery of the coated electric wire inserted through the lead-in port;

a shield shell disposed outside the housing so as to cover the grommet and with an end portion of the braid being crimped; and a conductive spacer configured to adjust an attachment height of the shield shell with respect to the sheet metal so as to fasten the shield shell to the sheet metal in a state where conduction is ensured.

Further, the water stop component for a shield cable is a water stop component configured to water-stop and fix the shield cable to a fixing target, the shield cable having a braid and a coated electric wire inside the braid, the water stop component including:

a grommet to be fitted into a lead-in port of the fixing target and configured to cover an outer periphery of the coated electric wire inserted through the lead-in port;

a shield shell covering the grommet and with an end portion of the braid being crimped; and a conductive spacer to be attached to the shield shell and configured to adjust an attachment height of the shield shell with respect to the fixing target.

The present invention has been briefly described as above. Further, details of the present invention will be clarified by reading a mode (hereinafter, referred to as "embodiment") for carrying out the invention to be described below with reference to the accompanying drawings.

DESCRIPTION OF EMBODIMENTS

A specific embodiment according to the present invention will be described with reference to the drawings.

Figure 1:
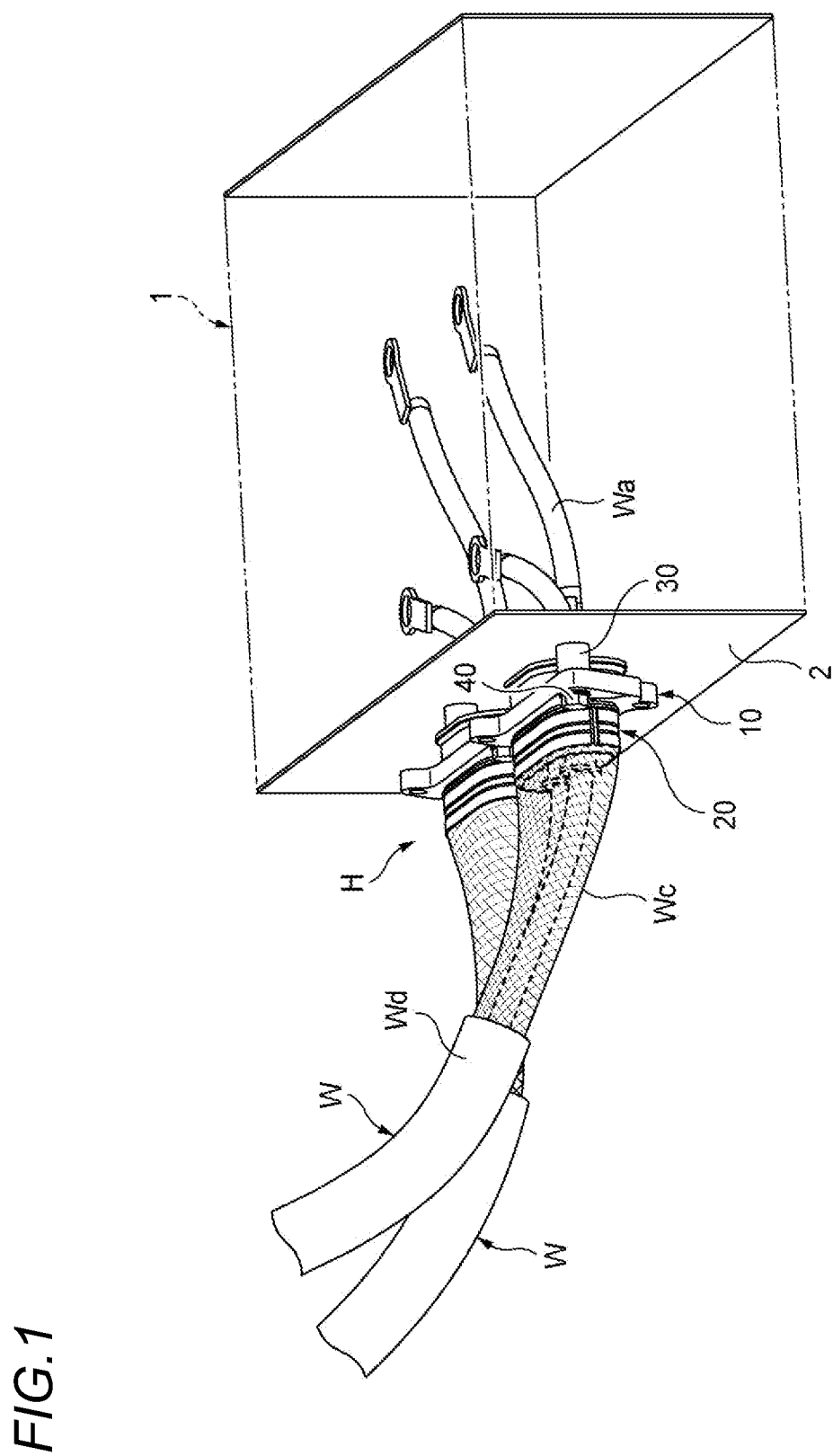
FIG. 1 is an external perspective view of a water stop structure according to the present embodiment.
Figure 2:
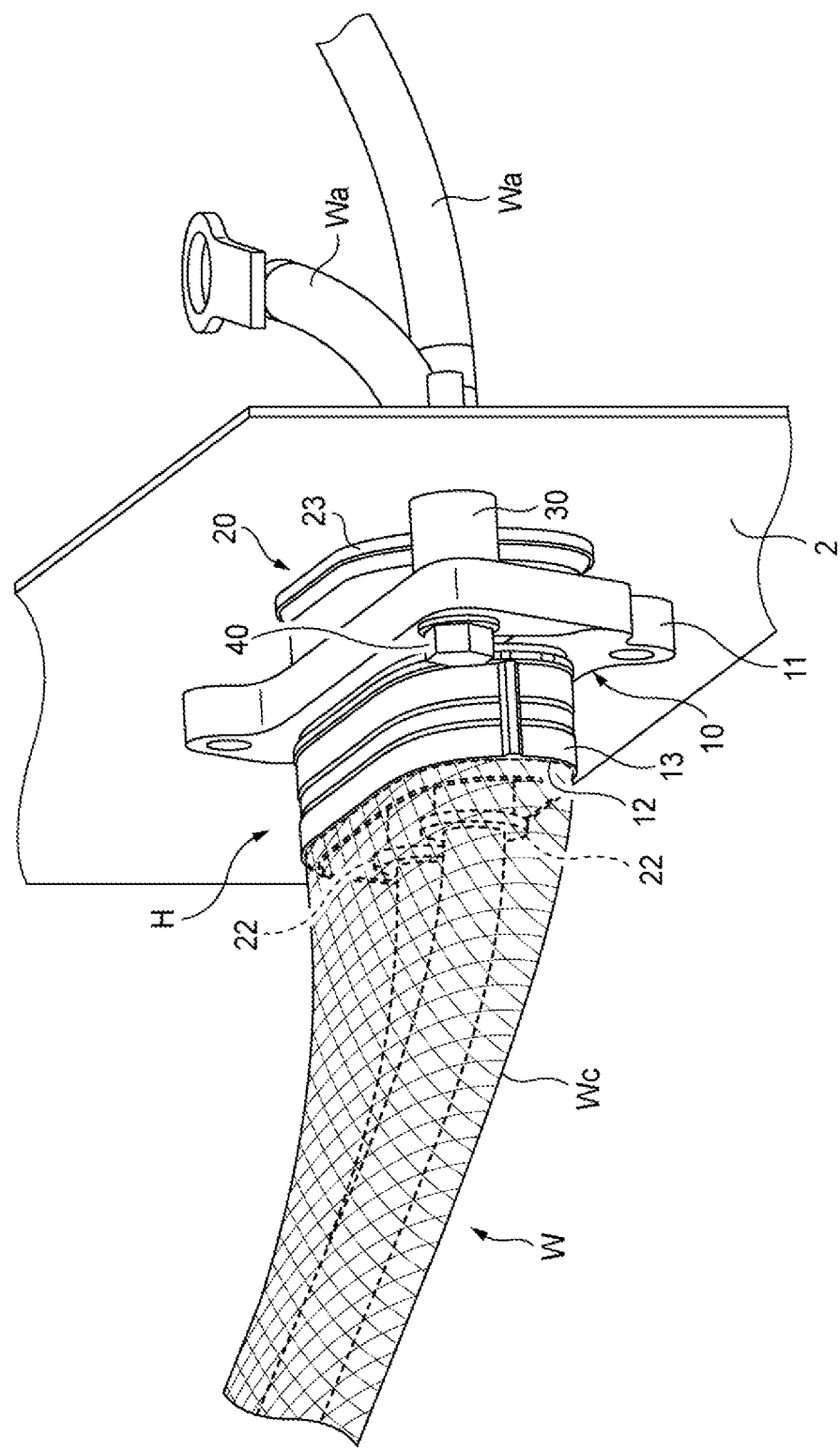
FIG. 2 is an enlarged view of a portion shown in FIG. 1.
Figure 3:
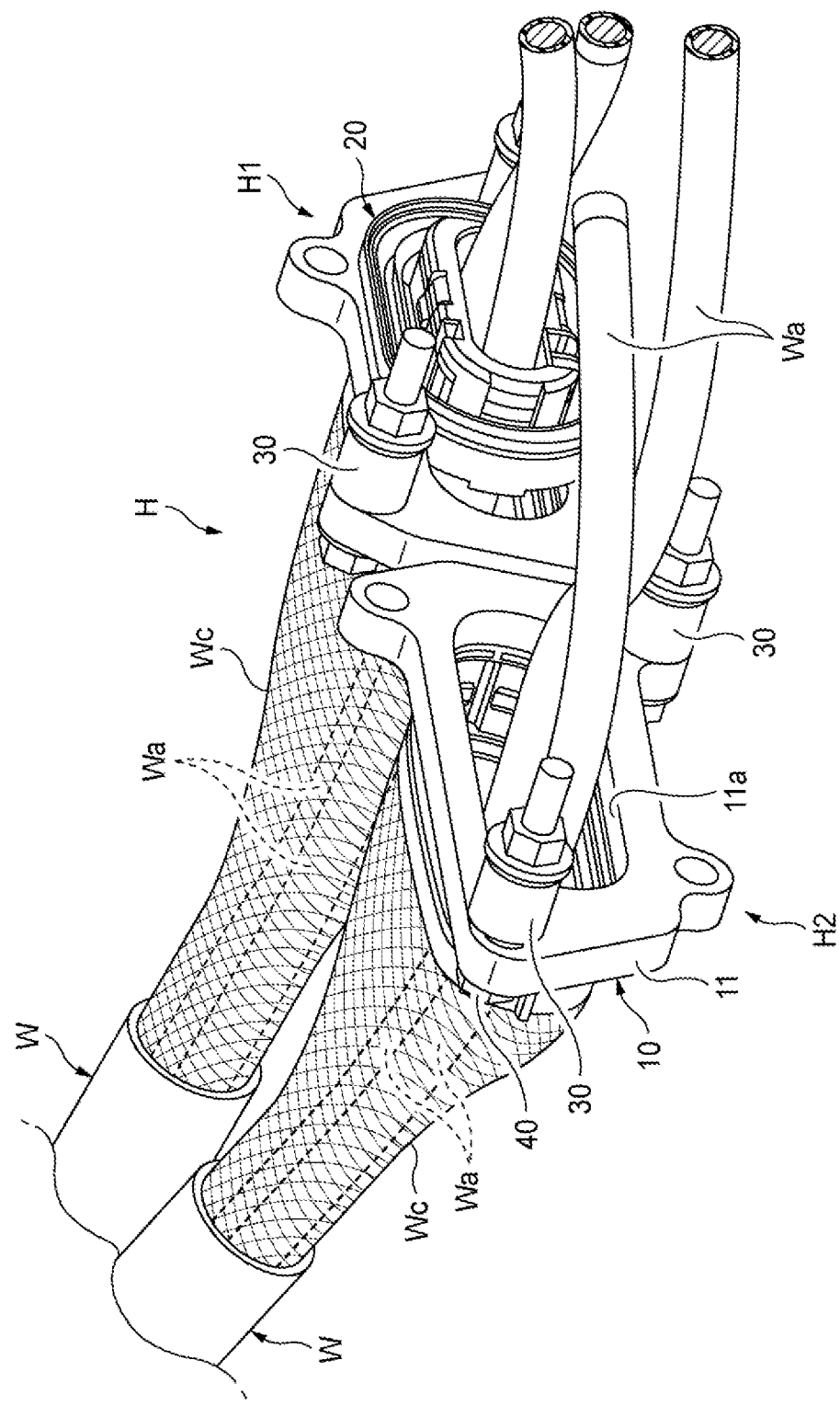
FIG. 3 is a view from an opposite side in which some components of the portion shown in FIG. 2 are omitted.
Figure 4:
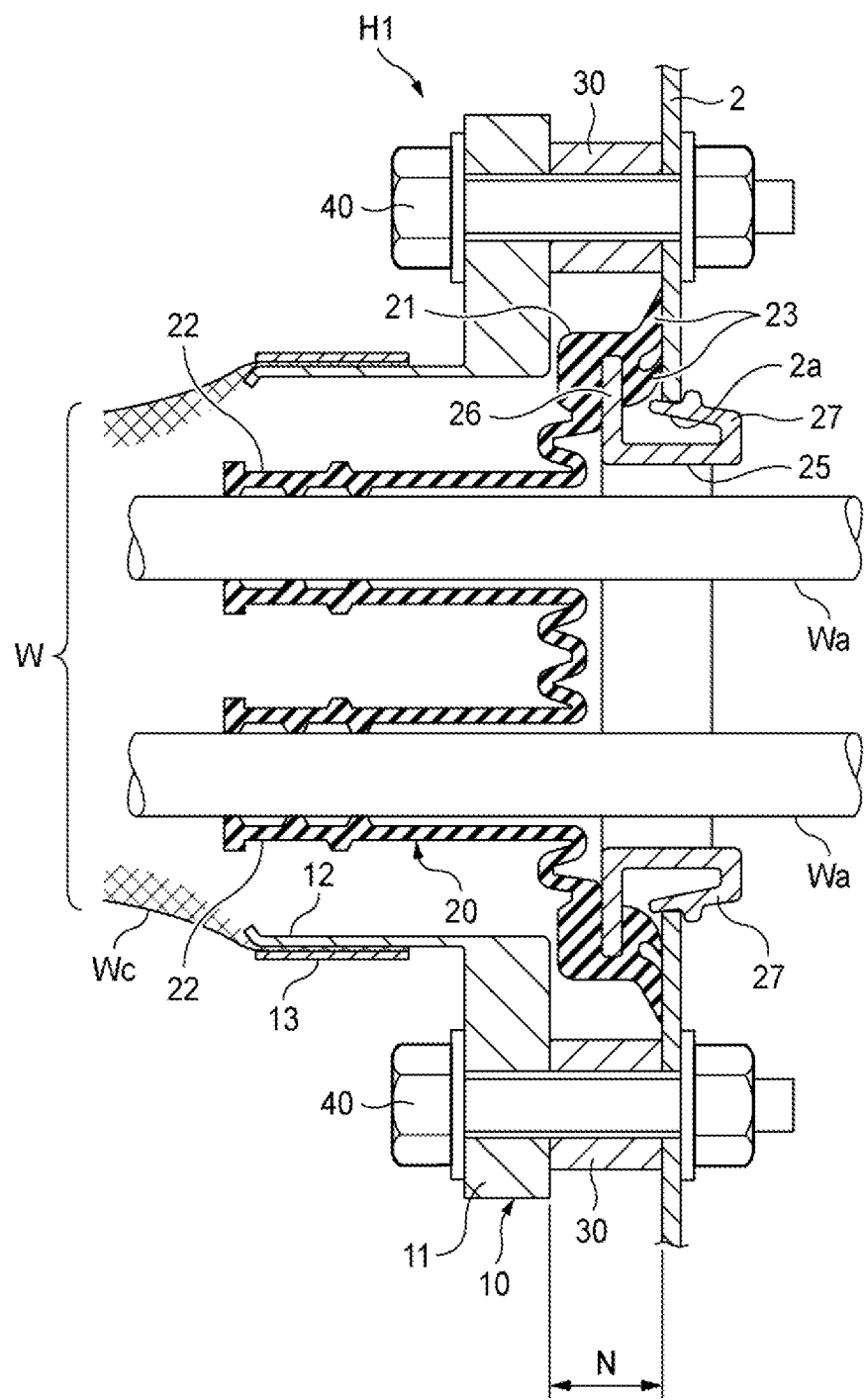
FIG. 4 is a schematic cross-sectional view of the water stop structure according to the present embodiment.
Figure 5:
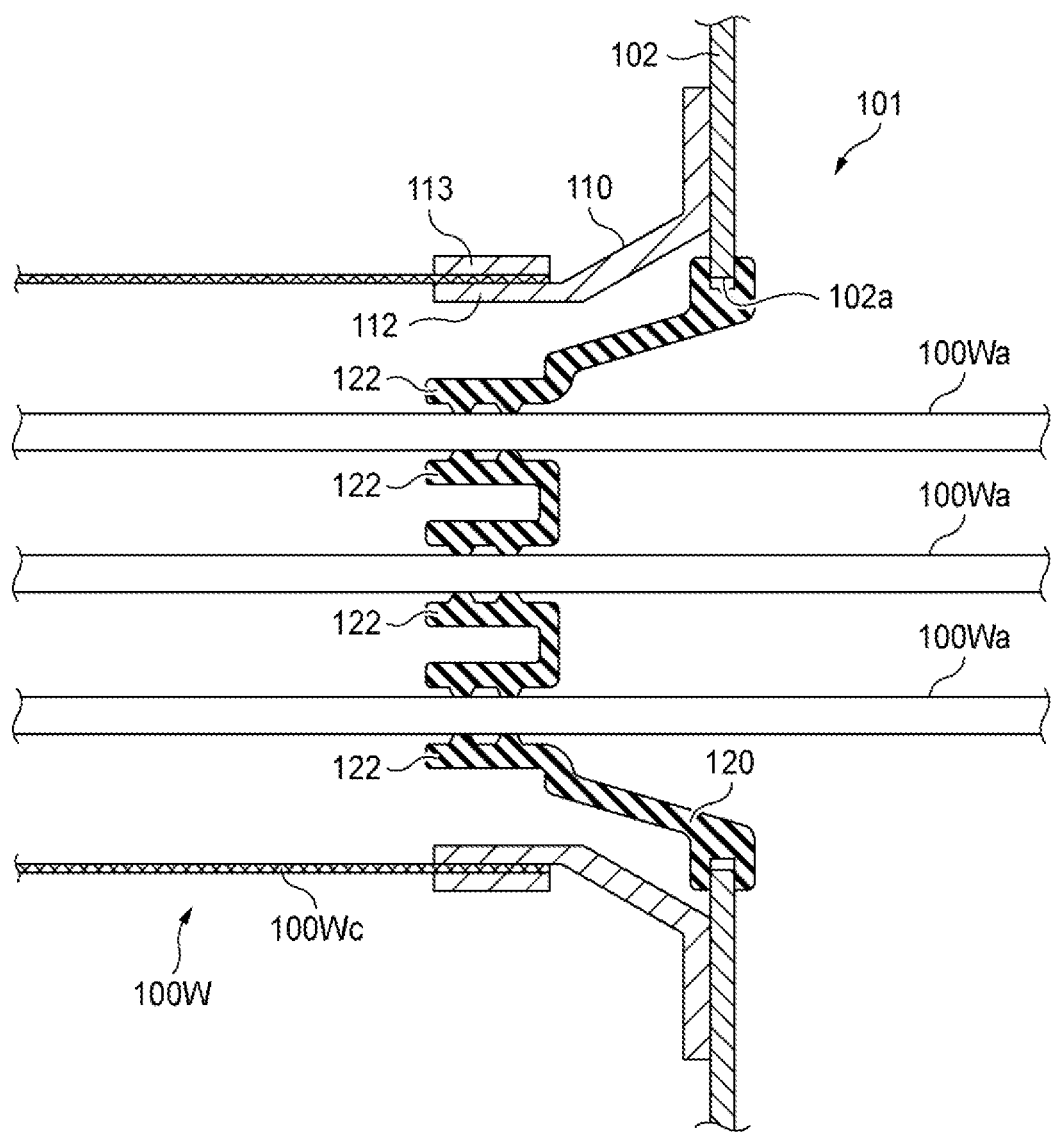
FIG. 5 is a cross-sectional view showing an example of a water stop structure in the related art.

FIG. 1 is an external perspective view of a water stop structure according to the present embodiment. FIG. 2 is an enlarged view of a portion shown in FIG. 1. FIG. 3 is a view from an opposite side in which some components of the portion shown in FIG. 2 are omitted. FIG. 4 is a schematic cross-sectional view of the water stop structure.

As shown in FIGS. 1 and 2, the water stop structure according to the present embodiment is a water stop structure applicable to a lead-in portion H where a shield cable W is led into a housing 1, the shield cable W having a braid Wc inside an exterior member Wd such as a corrugated tube and two insulation coated electric wires Wa inside the braid Wc. As an example, one end side of the shield cable W is connected to the housing 1 of a generator installed on the ground, and the other end side is connected to a load, a rechargeable battery, or the like (not shown). The water stop structure according to the present embodiment is applied to the lead-in portion H where the one end side of the shield cable W is led into the housing 1.

As shown in FIG. 4, a lead-in port 2a for leading the cable W into the housing 1 is formed in the sheet metal 2 constituting a part of the housing 1. The two exposed insulation coated electric wires Wa are inserted into the lead-in port 2a from the outside to the inside of the housing 1.

A grommet 20 is fitted in the lead-in port 2a in a liquid-tight manner. An outer peripheral edge of a flange portion 26 of a grommet inner 25 made of a hard resin is fitted into an inner peripheral groove of a flange portion 21 of the grommet 20, and the grommet 20 is integrated therewith. The grommet 20 is fixed to the sheet metal 2 by a plurality of engagement claws 27 of the grommet inner 25 being engaged with an opening edge of the lead-in port 2a of the sheet metal 2. Then, in this state, a seal lip 23 comes into liquid-tight contact with an outer surface of the sheet metal 2, and a gap between the seal lip 23 and the metal plate 2 is water-stopped.

In addition, the grommet 20 is provided with electric wire insertion tube portions 22 corresponding to the number of electric wires to be inserted, and the insulation coated electric wires Wa are inserted into the respective electric wire insertion tube portions 22. As a result, the grommet 20 liquid-tightly covers an outer periphery of the insulation coated electric wire Wa. Note that each of the insulation coated electric wires Wa may be more reliably water-stopped and fixed to the grommet 20 by tape winding from an outer periphery of each of the electric wire insertion tube portions 22.

A frame-shaped shield shell 10 is disposed on an outer surface side of the sheet metal 2 so as to surround the two electric wire insertion tube portions 22 of the grommet 20. FIG. 3 shows a relationship between the sizes of the shield shell 10 and the grommet 20. In FIG. 3, the grommet 20 is shown in a right lead-in portion H1, while the grommet 20 is not shown in a left lead-in portion H2.

When a dedicated grommet 20 and the shield shell 10 are used, a combination of the grommet 20 and the shield shell 10 is usually determined on a one-to-one basis, and the size of the grommet 20 is formed according to the size of an opening 11a of a flange portion 11 of the shield shell 10.

However, in the present embodiment, the size of the shield shell 10 is selected regardless of the size of the grommet 20. That is, the shield shell 10 of an existing used product other than the dedicated product to be combined with the grommet 20 is used. Examples of the standard for selecting the size of the shield shell 10 to be used include a large size that does not cause excessive deformation of the grommet 20 when the shield shell 10 is mounted on the sheet metal 2, and a size that allows an end portion of the braid Wc of the shield cable W to be crimped and connected without any inconvenience, and is selected freely.

In this way, the shield shell 10 can be selected and used without being restricted by the grommet 20. However, depending on the combination thereof, there is a possibility that the shield shell 10 excessively interferes with the grommet 20 when the shield shell 10 is mounted on the sheet metal 2. Therefore, in the present embodiment, when the shield shell 10 is attached and fixed to the sheet metal 2, the shield shell 10 is attached and fixed to the sheet metal 2 by a bolt 40 via a conductive spacer 30 for adjusting an attachment height N (see FIG. 4) of the shield shell 10 with respect to the sheet metal 2. In the present embodiment, the spacer 30 is formed in a cylindrical shape and is provided with a bolt insertion hole. The shield shell 10 is attached to the sheet metal 2 by the bolt 40 via four spacers 30. When the spacer 30 is temporarily fixed to the shield shell 10 in advance using the bolt 40, the spacer 30 can be easily attached to the sheet metal 2.

As a result, the shield shell 10 can be prevented from excessively interfering with the grommet 20. In addition, the sheet metal 2 and the shield shell 10 can be stably fastened to each other while being electrically connected to each other via the bolt 40.

The end portion of the braid Wc of the shield cable W is crimped and connected to an outer periphery of an opening cylindrical portion 12 of the shield shell 10 attached and fixed to the sheet metal 2 as described above by crimping a crimping ring 13.

According to the water stop structure having the above configuration, the shield shell 10 with the end portion of the braid Wc of the shield cable W crimped is connected to the sheet metal 2 of the housing 1 via the spacers 30 in a state in which conduction is secured. Therefore, the braid Wc of the shield cable W can be grounded via the sheet metal 2, and thus an electromagnetic shield by the braid Wc can be made to function.

At this time, the shield shell 10 is not directly fastened to the sheet metal 2, but is fastened while adjusting the attachment height N of the shield shell 10 with respect to the sheet metal 2 using the conductive spacer 30, so that there is no risk of excessively crushing the grommet 20. In addition, when using the shield shell 10 which is large enough not to excessively deform the grommet 20, a rough shield function can be provided although it is not strict, and thus the combination of the shield shell 10 with respect to the grommet 20 can be freely selected. That is, both the grommet 20 and the shield shell 10 can use an existing grommet 20 and an existing shield shell 10 as appropriate since the size restriction when combining both is relaxed.

As described above, according to the present embodiment, it is possible to relax the restriction on the size of component selection of the grommet 20 for ensuring the water stop function and the shield shell 10 for ensuring the shield function. Therefore, the existing grommet 20 and the existing shield shell 10 can be used as appropriate, and the cost can be reduced. For example, for a device disposed in a covered area such as a generator for home use, since a requirement for water stop performance is slightly reduced, it is preferable to apply the water stop structure according to the present embodiment. The water stop structure according to the present embodiment is not limited to the use described above, and can also be used for a vehicle.

In addition, as a water stop structure for a shield cable, there is a method in which a member in which a connector and a shield shell are integrated is fitted into a through hole of a sheet metal, and an end portion of the shield cable is connected to the connector. In this method, it is necessary to provide a terminal block inside the device for fixing a terminal extending from the connector. In this regard, in the water stop structure for the shield cable according to the present embodiment, since it is not necessary to use a connector, it is not necessary to provide a terminal block in the device, and as a result, the size can be reduced.

In addition, in a case where the shield shell is fixed to the sheet metal by using a plurality of cylindrical spacers, when used for an application in which a strict shield function is not required, it is possible to further relax the restriction on the size of component selection of the grommet 20 for ensuring the water stop function and the shield shell 10 for ensuring the shield function.

When the attachment height N of the shield shell 10 is adjusted, the shield shell 10 and the grommet 20 may be separated from each other as in the illustrated example, but it is preferable that a length of the spacer 30 is adjusted to such an extent that the shield shell 10 lightly presses the grommet 20 (to such an extent that the grommet 20 is not distorted).

The present invention is not limited to the above embodiment, and modifications, improvements, and the like can be made as appropriate. In addition, materials, shapes, dimensions, numbers, arrangement locations and the like of elements in the above embodiment are optional and not limited as long as the object of the present invention can be achieved.

For example, in the present embodiment, the shield shell 10 is disposed so as to surround the two electric wire insertion tube portions 22 of the grommet 20, but the shield shell 10 may be positioned on a side opposite to the sheet metal 2 with respect to the flange portion 21 of the grommet 20. That is, the shield shell 10 may be disposed so as to cover a surface side of the grommet 20 (the side opposite to the sheet metal 2).

Figure 6:
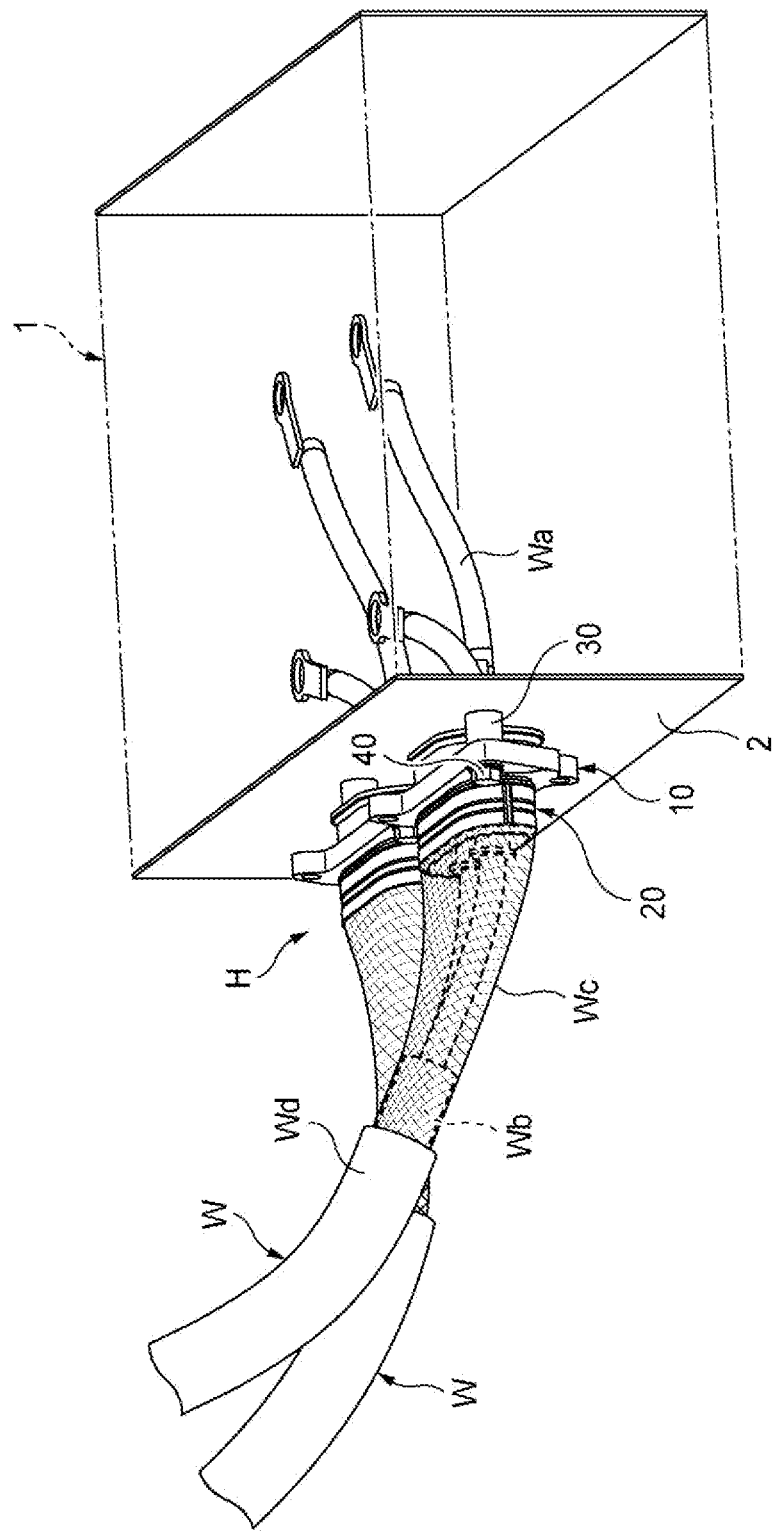
FIG. 6 is an external perspective view of a water stop structure according to a modification.

As shown in FIG. 6 as a modification, the water stop structure according to the embodiment may be applied to the shielded cable W having the braid Wc inside the exterior member Wd, an insulator Wb inside the braid Wc, and the insulation coated electric wire Wa inside the insulator Wb.

In the above embodiment, a case where the shield shell 10 is fixed to the sheet metal 2 by using a plurality of cylindrical spacers 30 is described, but the shield shell 10 may be fixed to the sheet metal 2 by using one shell-shaped spacer 30 that covers the entire outer periphery of the grommet 20. That is, the insulation coated electric wire Wa in the vicinity of the grommet 20 and the lead-in port 2a is shielded by the shell-shaped spacer 30. As a result, the performance of the electromagnetic shield in the vicinity of the grommet can be enhanced as compared with the case of using a cylindrical spacer.

In the above embodiment, a case where the shield shell 10 and the grommet 20 are not in contact with each other or the shield shell 10 lightly presses the grommet 20 is described, but the grommet 20 may be fitted into the opening 11a of the shield shell 10 to form an assembly as a water stop component. In this case, if the assembly includes the spacer 30 in advance, convenience of attachment of the assembly to the sheet metal 2 is improved.

The shield cable W shown in the present embodiment is an example, and the shield cable W may have a sheath, for example.

Here, characteristics of a water stop structure and a water stop component to be applied to a lead-in portion where a shield cable is led into a housing according to the embodiment of the present invention described above will be briefly summarized and listed in the following [1] to [5].

[1] A water stop structure for a shield cable (W) to be applied to a lead-in portion where the shield cable is led into a housing (1), the shield cable having a braid (Wc) and a coated electric wire (Wa) inside the braid (Wc), the water stop structure for a shield cable including:

a lead-in port (2a) formed in a sheet metal (2) constituting a part of the housing (1) and through which the exposed coated electric wire (Wa) is inserted from outside to inside of the housing (1);

a grommet (20) to be fitted into the lead-in port (2a) and configured to cover an outer periphery of the coated electric wire (Wa) inserted through the lead-in port (2a);

a shield shell (10) disposed outside the housing (1) so as to cover the grommet (20) and with an end portion of the braid (Wc) being crimped; and a conductive spacer (30) configured to adjust an attachment height of the shield shell (10) with respect to the sheet metal (2) so as to fasten the shield shell (10) to the sheet metal (2) in a state where conduction is ensured.

[2] In the water stop structure for a shield cable according to [1], the spacer (30) is formed in a tubular shape, and the shield shell (10) is fixed to the sheet metal (2) via a plurality of the spacers (30) disposed on an outer periphery of the grommet (20).

[3] In the water stop structure for a shield cable according to [1], the spacer (30) has a shell shape surrounding an outer periphery of the grommet (20).

[4] In the water stop structure for a shield cable according to any one of [1] to [3], the shield cable (W) is a high-voltage cable.

[5] A water stop parts for a shield cable configured to water-stop and fix the shield cable to a fixing target, the shield cable having a braid and a coated electric wire inside the braid, the water stop component including:

a grommet to be fitted into a lead-in port of the fixing target and configured to cover an outer periphery of the coated electric wire inserted through the lead-in port;

a shield shell covering the grommet and with an end portion of the braid being crimped; and a conductive spacer to be attached to the shield shell and configured to adjust an attachment height of the shield shell with respect to the fixing target.

According to the water stop structure of [1], the shield shell with the end portion of the braid of the shield cable crimped is connected to the sheet metal of the housing via the space in the state where conduction is ensured. Therefore, the braid of the shield cable can be grounded via the sheet metal, and thus an electromagnetic shield by the braid can be made to function. At this time, the shield shell is not directly fastened to the sheet metal, but is fastened while adjusting the attachment height of the shield shell with respect to the sheet metal using the spacer, so that there is no risk of excessively crushing the grommet. In addition, when using the shield shell which is large enough not to excessively deform the grommet, the combination of the shield shell with the grommet can be freely selected while providing the shield function. That is, both the grommet and the shield shell can use an existing grommet and an existing shield shell as appropriate since the size restriction when combining both is relaxed. Therefore, it is not necessary to manufacture a dedicated grommet or shield shell, and cost can be reduced.

According to the water stop structure of [2], when used for an application in which a strict shield function is not required, the shield shell and the sheet metal can be fixed by appropriately arranging a required number of spacers that can be easily formed.

According to the water stop structure of [3], the spacer has a shell shape, so that the performance of the electromagnetic shield in the vicinity of the grommet can be ensured without using a dedicated grommet or shield shell.

According to the water stop structure of [4], when connecting a high voltage cable, it is possible to satisfy a certain degree of shield function and water-stop function while reducing the cost.

According to the water stop component of [5], the shield shell with the end portion of the braid of the shield cable crimped is connected to the fixing target via the space in the state where conduction is ensured. Therefore, the braid of the shield cable can be grounded via the sheet metal, and thus an electromagnetic shield by the braid can be made to function. In this case, both the grommet and the shield shell can use an existing grommet and an existing shield shell as appropriate since the size restriction when combining both is relaxed. Therefore, it is not necessary to manufacture a dedicated grommet or shield shell, and cost can be reduced.

According to the present invention, it is possible to relax the restriction on the size of component selection of the grommet for ensuring the water stop function and the shield shell for ensuring the shield function. Therefore, an existing grommet and an existing shield shell can be used as appropriate, and the cost can be reduced.

What is claimed is:

1. A water stop structure for a shield cable to be applied to a lead-in portion where the shield cable is led into a housing, the shield cable having a braid and a coated electric wire inside the braid, the water stop structure for a shield cable comprising:
    a lead-in port formed in a sheet metal constituting a part of the housing and through which the exposed coated electric wire is inserted from outside to inside of the housing;
    a grommet to be fitted into the lead-in port and configured to cover an outer periphery of the coated electric wire inserted through the lead-in port;
    a shield shell disposed outside the housing so as to cover the grommet and with an end portion of the braid being crimped; and
    a conductive spacer configured to adjust an attachment height of the shield shell with respect to the sheet metal so as to fasten the shield shell to the sheet metal in a state where conduction is ensured.

2. The water stop structure for a shield cable according to claim 1,
    wherein the spacer is formed in a tubular shape, and the shield shell is fixed to the sheet metal via a plurality of the spacers disposed on an outer periphery of the grommet.

3. The water stop structure for a shield cable according to claim 1,
    wherein the spacer has a shell shape surrounding an outer periphery of the grommet.

4. The water stop structure for a shield cable according to claim 1,
    wherein the shield cable is a high-voltage cable.

5. A water stop component for a shield cable configured to water-stop and fix the shield cable to a fixing target, the shield cable having a braid and a coated electric wire inside the braid, the water stop component comprising:
    a grommet to be fitted into a lead-in port of the fixing target and configured to cover an outer periphery of the coated electric wire inserted through the lead-in port;
    a shield shell covering the grommet and with an end portion of the braid being crimped; and
    a conductive spacer to be attached to the shield shell and configured to adjust an attachment height of the shield shell with respect to the fixing target.

* * * * *